US007499700B2

(12) United States Patent
Dillon et al.

(10) Patent No.: US 7,499,700 B2
(45) Date of Patent: Mar. 3, 2009

(54) METHOD AND APPARATUS FOR MOBILE STATION MANAGEMENT AND SYSTEM

(75) Inventors: Matthew J. Dillon, Hawthorn Woods, IL (US); John M. Harris, Chicago, IL (US); Jerome O. Vogedes, Wind Lake, WI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/280,990

(22) Filed: Nov. 17, 2005

(65) Prior Publication Data

US 2006/0128371 A1    Jun. 15, 2006

Related U.S. Application Data

(60) Provisional application No. 60/635,237, filed on Dec. 10, 2004.

(51) Int. Cl.
*H04B 17/00* (2006.01)
(52) U.S. Cl. ............ 455/423; 455/67.11; 455/67.13; 455/67.14; 455/424; 455/425
(58) Field of Classification Search ............ 455/423, 455/425, 453
See application file for complete search history.

(56) References Cited

U.S. PATENT DOCUMENTS

| | | | | |
|---|---|---|---|---|
| 5,859,838 A * | 1/1999 | Soliman | | 370/249 |
| 6,088,588 A * | 7/2000 | Osborne | | 455/425 |
| 6,445,917 B1 * | 9/2002 | Bark et al. | | 455/423 |
| 6,766,165 B2 | 7/2004 | Sharma et al. | | |
| 7,003,290 B1 * | 2/2006 | Salonaho et al. | | 455/423 |
| 2001/0031626 A1 * | 10/2001 | Lindskog et al. | | 455/67.3 |
| 2004/0087340 A1 * | 5/2004 | Cao et al. | | 455/560 |
| 2004/0097237 A1 * | 5/2004 | Aoyama | | 455/445 |
| 2004/0152362 A1 * | 8/2004 | Carter et al. | | 439/660 |
| 2005/0042987 A1 * | 2/2005 | Lee et al. | | 455/67.11 |
| 2007/0149134 A1 * | 6/2007 | Sebire et al. | | 455/67.11 |

FOREIGN PATENT DOCUMENTS

| WO | WO 03/055248 A1 | 7/2003 |
|---|---|---|
| WO | WO 03/088699 A1 | 10/2003 |

* cited by examiner

*Primary Examiner*—Vincent P Harper
*Assistant Examiner*—Mazda Sabouri (57) ABSTRACT

A communication system optimizes system performance by selectively managing which mobile stations (MSs) are to serve as test MSs. The test MSs report system operating parameters in order to detect sleeping cells, coverage holes, or other flaws in system coverage or in order to determine an impact of a change in an access network configuration. The communication system further provides for end-to-end messaging between the test MSs and network servers via an access network and a core network, thereby permitting network elements that are best able to perform system optimization to control the monitoring, measuring, and reporting by the MSs. To minimize system and user inconvenience, reporting by a test MS further may be based on one or more of whether the MS is in an area of low mobility, has an acceptable power source output level, and is operating in a cell with an acceptable load level.

5 Claims, 6 Drawing Sheets

METHOD AND APPARATUS FOR MOBILE STATION MANAGEMENT AND SYSTEM

CROSS REFERENCE TO RELATED APPLICATION

The present application claims priority from provisional application Ser. No. 60/635,237, entitled "METHOD AND APPARATUS FOR MOBILE STATION MANAGEMENT AND SYSTEM OPTIMIZATION," filed Dec. 10, 2004, which is commonly owned and incorporated herein by reference in its entirety.

FIELD OF THE INVENTION

The present invention relates generally to wireless communication systems, and, in particular, to mobile station management and system optimization in a wireless communication system.

BACKGROUND OF THE INVENTION

When a mobile station (MS) is engaged in a call, the MS may periodically monitor a strength of pilot channels associated with nearby base stations subsystems (BSSs) or radio access networks (RANs) and report the signal strength measurements back to a BSS or RAN serving the MS. The signal strength reports may be transmitted by the MS when the measurements are made or, in order to save battery strength and bandwidth, may be transmitted by the MS only when the measured signal strengths fall beneath a predetermined threshold.

Such a reporting system is designed to facilitate a handoff of an MS. Such a reporting system is not designed to facilitate, and does not facilitate, an efficient detection of flaws in system design or configuration that may result in problems such as areas of poor radio frequency (RF) coverage or areas of excessive channel assignment or call setup latencies. For example, mere reports of measured signal strength will not necessarily indicate sleeping cells, coverage holes, sub-optimal access network configurations, and the like. Furthermore, the signal strengths measured by the MSs are not necessarily the system parameters that are most useful for optimizing system performance, and the BSS or RAN that typically terminate such reports are not the best network elements for optimizing system performance based on such reports. In addition, the periodic measuring and reporting of signal strengths by MSs engaged in a call do not provide an efficient system for gauging an impact on system coverage of a change in a configuration of an access network, that is, a change in access network parameters.

As a result, in order to detect areas of poor RF coverage or an impact of a change in access network configuration, typically system operators will manually drive the system in vehicles loaded with transceivers, meters, and various call analyzers and look for system holes or other flaws or inefficiencies in system coverage and system performance. However, driving a system is inefficient, labor intensive, costly, slow, and time consuming. Furthermore, a system operator must re-drive the system each time access networks are reconfigured in order to determine the impact of the new configuration.

Therefore a need exists for a method and an apparatus that automatically detects system holes or other flaws or inefficiencies in system coverage or system performance and that measures and reports system operating parameters for the areas of flawed or inefficient system coverage or system performance.

DETAILED DESCRIPTION OF THE INVENTION

To address the need for a method and an apparatus that automatically detects system holes or other flaws or inefficiencies in system coverage or system performance and that measures and reports system operating parameters for the areas of flawed or inefficient system coverage or system performance, a communication system is provided that optimizes system performance by selectively managing which mobile stations (MSs) operating in the communication system are to serve as test MSs. Based on policies provisioned to the test MSs and in response to an occurrence of a trigger event, the test MSs then report system operating parameters in order to detect sleeping cells, coverage holes, or other flaws in system coverage or in order to determine an impact of a change in an access network configuration. The communication system further provides for an end-to-end messaging between the test MSs and network servers via an access network and a core network with respect to an instructing of, and a reporting by, the test MSs, thereby permitting network elements that are best able to perform system optimization to control the monitoring, measuring, and reporting by the test MSs. To minimize system and user inconvenience, a sending of each such report further may be based on one or more of whether a mobile station (MS) is in an area of low mobility, has an acceptable power source output level, and is operating in a cell with an acceptable load level.

Generally, an embodiment of the present invention encompasses a method for managing reporting by a mobile station. The method includes measuring system parameters, determining whether a trigger event has occurred, in response to determining that a trigger event has occurred, determining at least one of whether the mobile station is in an area of low mobility, whether the mobile station has an acceptable power source output level, and whether the mobile station is operating in a cell with an acceptable cell loading level, and when the mobile station is in an area of low mobility, the mobile station has an acceptable power source output level, and the mobile station is operating in a cell with an acceptable cell loading level, reporting, by the mobile station, the measured system parameters.

Another embodiment of the present invention encompasses a method for managing reporting by a mobile station. The method includes measuring system operating parameters, determining whether the mobile station is in an area of low mobility, in response to determining that the mobile station is in an area of low mobility, determining whether a trigger event has occurred. The method further includes, in response to determining that a trigger event has occurred, determining at least one of whether the mobile station has an acceptable power source output level and whether the mobile station is operating in a cell with an acceptable cell loading level, and when the mobile station has an acceptable power source output level and the mobile station is operating in a cell with an acceptable cell loading level, reporting, by the mobile station, the measured system parameters.

Yet another embodiment of the present invention encompasses a mobile station capable of reporting system operating parameters to a base station. The mobile station includes a processor that measures system operating parameters, determines whether a trigger event has occurred, in response to determining that a trigger event has occurred determines at least one of whether the mobile station is in an area of low mobility, whether the mobile station has an acceptable power source output level, and whether the mobile station is operating in a cell with an acceptable cell loading level, and when the mobile station is in an area of low mobility, the mobile station has an acceptable power source output level, and the mobile station is operating in a cell with an acceptable cell loading level, reports the measured system parameters.

Still another embodiment of the present invention encompasses a mobile station capable of reporting system operating parameters to a base station. The mobile station includes a processor that measures system parameters, determines whether the mobile station is in an area of low mobility, in response to determining that the mobile station is in an area of low mobility determines whether a trigger event has occurred, in response to determining that a trigger event has occurred, determines at least one of whether the mobile station has an acceptable power source output level and whether the mobile station is operating in a cell with an acceptable cell loading level, and when the mobile station has an acceptable power source output level and the mobile station is operating in a cell with an acceptable cell loading level, reports the measured system parameters.

Yet another embodiment of the present invention encompasses an apparatus for managing a measuring and reporting of system operating parameters by a mobile station. The apparatus includes an at least one memory device that maintains system operating parameter measurement and report policies that comprise information concerning system operating parameters that are measured by a mobile station and reported by the mobile station to the network server. The apparatus further includes an at least one processor coupled to the at least one memory device that determines a test mobile station that is to execute the system operating parameter measurement and report policies and that conveys the system operating parameter measurement and report policies to the test mobile station.

Figure 1:
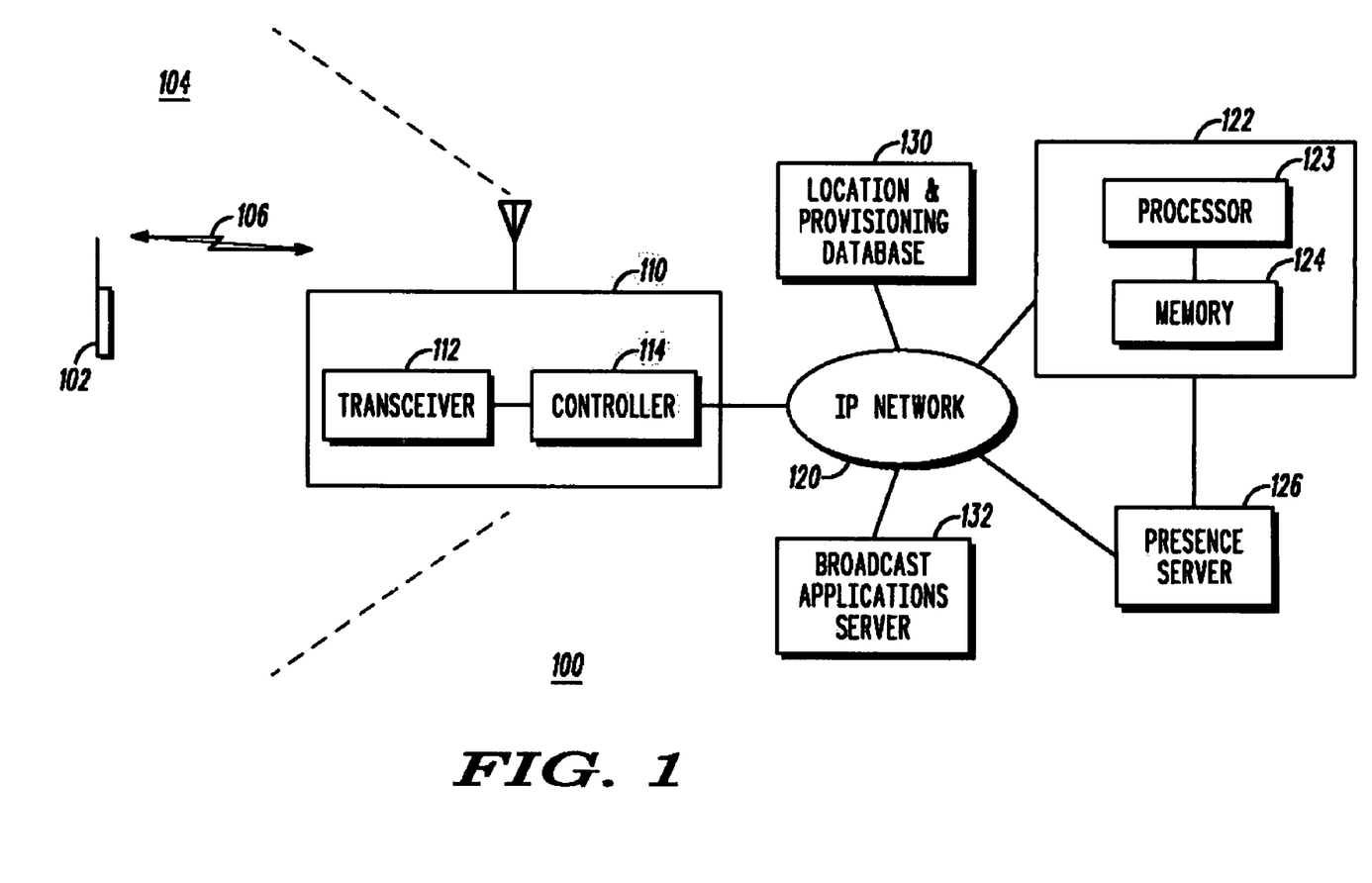
FIG. 1 is a block diagram of a wireless communication system in accordance with an embodiment of the present invention.

The present invention may be more fully described with reference to FIGS. 1-6. FIG. 1 is a block diagram of a wireless communication system 100 in accordance with an embodiment of the present invention. Communication system 100 includes at least one access network 110 (one shown), such as a Base Station Subsystem (BSS), a Radio Access Network (RAN), or a Wireless Local Area Network (WLAN) Access Point (AP), that provides wireless communication services to at least one mobile station (MS) 102 (one shown), also referred to herein as a client device, residing in a coverage area 104, for example, a cell, a sector of a cell, or whatever is appropriate for the communication technology employed by communication system 100, serviced by the access network. Access network 110 includes a transceiver 112, for example, a Base Station Transceiver (BTS) or a Node B, coupled to a network controller 114, for example, a Base Station Controller (BSC) or a Radio Network Controller (RNC). Access network 110 provides communications services to MS 102 via an air interface 106. Air interface 106 includes a forward link that includes at least one forward link traffic channel and at least one forward link signaling channel. The forward link may or may not further include a paging channel. For example, in a CDMA 2000 1XEV-DO communication system, the paging function is performed using a Route Update Protocol. Air interface 106 further includes a reverse link that includes at least one reverse link traffic channel, at least one reverse link signaling channel, and an access channel.

Communication system 100 further includes a core network 120, preferably an Internet Protocol (IP)-based network, coupled to access network 110 and a network server, and more specifically a Device Management and System Optimization Server (DMSOS) 122, coupled to the core network. DMSOS 122 preferably comprises at least one processor 123, such as one or more microprocessors, microcontrollers, digital signal processors (DSPs), combinations thereof or such other devices known to those having ordinary skill in the art, and an associated at least one memory device 124, such as random access memory (RAM), dynamic random access memory (DRAM), and/or read only memory (ROM) or equivalents thereof, that maintains data and programs that may be executed by the corresponding processor. Unless otherwise specified herein, the functions performed by DMSOS 122 are performed by the at least one processor 123 of the DMSOS.

Core network 120 is further coupled to a Presence Server 126 and a location and provisioning database 130, and the Presence server is further coupled to DMSOS 122. Location and provisioning database 130 stores an MS identifier associated with each MS active in communication system 100, such as MS 102, and maintains and tracks provisioning and mobility information with respect to each such MS, including registration of the MS when the MS activates in communication system 100 and a most recent location of the MS, that is, an access network, such as access network 110, or a transceiver, such as transceiver 112, serving the MS. Location and provisioning database 130 may be included in a Home Location Register (HLR) or a Visited Location Register (VLR), or a combination of an HLR and a VLR, or a Home Agent (HA) or a Foreign Agent (FA), or a combination of an HA and an FA, as known in the art.

Communication system 100 may farther include a broadcast application server 132, such as a Broadcast-Multicast Service (BCMCS) Controller and/or a BCMCS Content Server, or a Broadcast Multicast Service Center (BM-SC) and possibly other servers such as a User Support Server, that is coupled to core network 120. Each of access network 110, DMSOS 122, Presence Server 126, location and provisioning database 130, and broadcast application server 132 comprises a network element of communication system 100 and, together with core network 120, are collectively referred to herein as a infrastructure of communication system 100. One of ordinary skill in the art realizes that the infrastructure may further include other network elements, such as one or more gateways, for example, a Packet Data Serving Node (PDSN) and/or a Broadcast Serving Node (BSN), or a Serving GPRS Support Node (SGSN) and a Gateway GPRS Support Node (GGSN), and one or more Operations and Maintenance Centers (OMCs), that are not depicted in FIG. 1 as FIG. 1 is provided merely to illustrate the principles of the present invention and is not intended to be an exclusive depiction of communication system 100.

Figure 2:
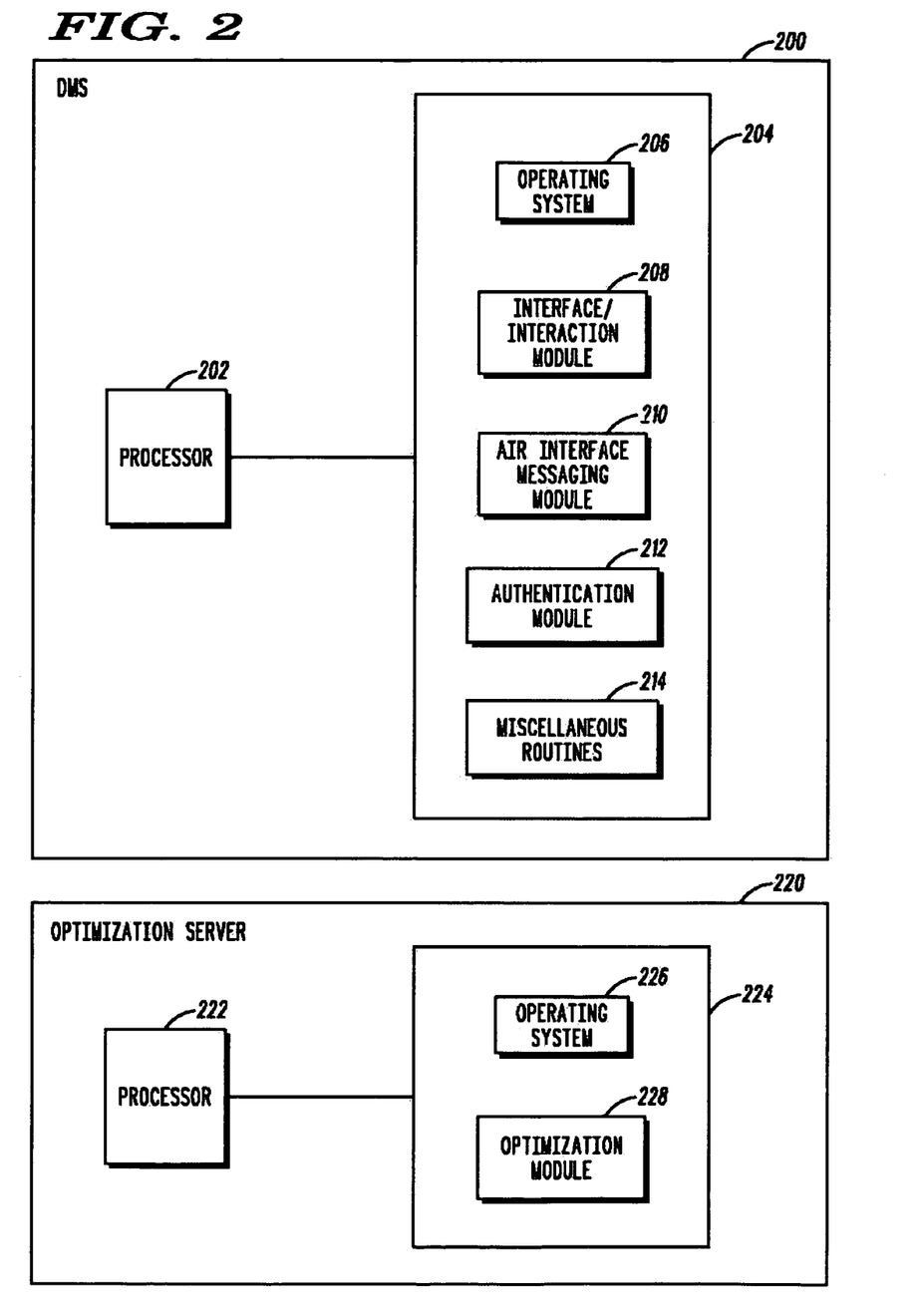
FIG. 2 is a block diagram of an architecture of a Device Management and System Optimization Server of FIG. 1 in accordance with another embodiment of the present invention.
Figure 3:
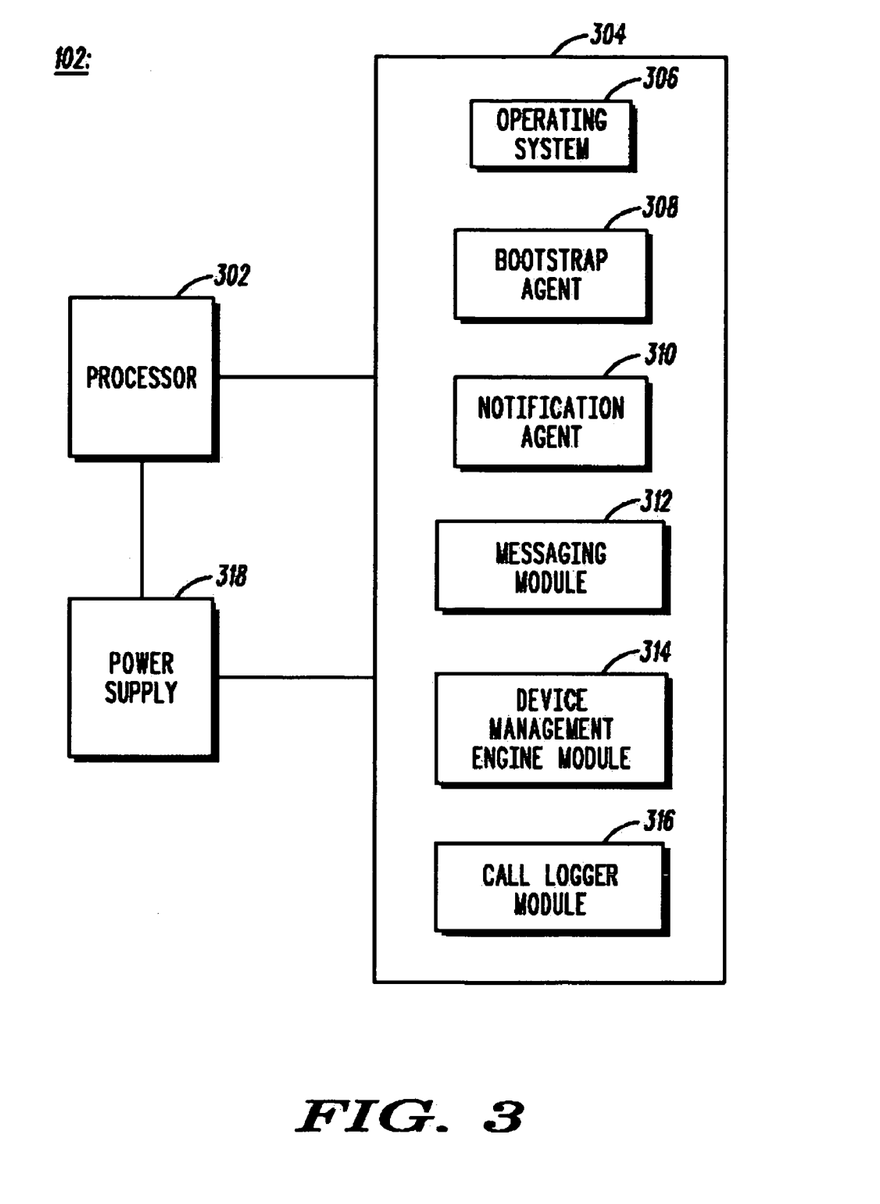
FIG. 3 is a block diagram of an architecture of a mobile station of FIG. 1 in accordance with an embodiment of the present invention.

Referring now to FIGS. 2 and 3, block diagrams are provided that respectively illustrate an architecture of DMSOS 122 and MS 102. In one embodiment of the invention, the functionality depicted in FIG. 2 may reside in a single server, that is, DMSOS 122, wherein the functions of respective processors 202 and 222 of DMS 200 and Optimization Server 220 are performed by the at least one processor 123 of the DMSOS and the software maintained in respective at least one memory devices 204 and 224 of the DMS and the Optimization Server are maintained in the at least one memory device 124 of the DMSOS. In another embodiment of the invention, as depicted in FIG. 2, the functionality of DMSOS 122 may be distributed among multiple servers, such as DMS 200 and Optimization Server 220. As depicted in FIGS. 2 and 3, each of DMS 200, Optimization Server 220, and MS 102 includes a respective processor 202, 222, 302, such as one or more microprocessors, microcontrollers, digital signal processors (DSPs), combinations thereof or such other devices known to those having ordinary skill in the art. Unless otherwise specified herein, the functions performed by each of DMS 200, Optimization Server 2202, and MS 102 are performed by the respective processor 202, 222, and 302 of the DMS, Optimization Server, and MS. The particular operations/functions of processors 202, 222, and 302, and respectively thus of DMS 200, Optimization Server 220, and MS 102, are determined by an execution of software instructions and routines that are maintained in a respective at least one memory device 204, 224, and 304 associated with the processor, such as random access memory (RAM), dynamic random access memory (DRAM), and/or read only memory (ROM) or equivalents thereof, that maintain data and programs that may be executed by the corresponding processor.

Referring now to FIG. 2, the software maintained in at least one memory device 204 of DMS 200 generally includes an operating system (OS) 206 comprising data and variables for providing overall control. Additionally, an Optimization Server interface or interaction module or routine 208 includes discovery and association functions and the like to support an ability to interface with Optimization Server 124 for exchanging messages according to a standard protocol, for example, RMI, for the developed features of a UMTS or CDMA-1X MS, including messaging related to monitoring performance related to a quality of an experience of a user of a client device, such as MS 102, and end-to-end network testing. Further included is an air interface messaging module or routine 210 that supports initiation and/or notification of system performance monitoring and testing via unicast or broadcast messages sent to client devices and other messaging in support of system performance monitoring and testing. The software further includes an authentication module or routine 212 that support authentication via an exchange of credentials exchange with the client devices or even more sophisticated security means, such as PKI oriented solutions. Additional modules, or routines, 214, such as bindings over corresponding transport channels with respect to transport of bearer traffic and communication session success/failure notifications and session closure, may further be included in at least one memory device 204 as will be recognized by one of ordinary skill in the art.

Still referring to FIG. 2, the software maintained in at least one memory device 224 of Optimization Server 220 also generally includes an operating system (OS) 226 comprising data and variables for providing overall control. In addition, the software includes optimization applications 228 that communicate with applications running on client devices serviced by the Optimization Server, such as MS 102. In order to establish communications with client devices such as MS 102, Optimization Server 220 builds a Transport Control Protocol (TCP)/Internet Protocol (IP) tunnel through data network 120 to access network 110. Optimization Server 220 may instruct the client devices to execute applications that perform system monitoring and testing, such as monitoring and testing voice quality, Push-to-Talk (PTT) data quality, latency, and throughput. The instructions may be conveyed to a random set of client devices or Optimization Server 220 may determine a targeted set of devices and convey the instructions to the target set. Optimization Server 220 may accept client-based triggered information, such as radio frequency (RF) loss reports, lost access attempts, cells or sectors unable to be accessed by the client devices, and regions of poor RF quality and, based on system parameter information received from the client devices, may build traffic distribution maps and path loss maps. Optimization Server 124 further broadcasts information to targeted clusters of client devices, such as a user group or talkgroup, for use before or after the client devices make their system parameter measurements.

Referring now to FIG. 3, the software maintained in at least one memory device 304 of MS 102 also generally includes an operating system (OS) 306 comprising data and variables for providing overall control. In addition, the software includes multiple modules or routines 308, 310, 312, 314, and 316. A Bootstrap agent 308 has the responsibility for exchanging required information with DMSOS 122 prior to any end-to-end performance testing and/or management session. A Notification agent 310 is responsible for notifications to server 122 to initiate performance monitoring and/or end-to-end testing sessions. A Messaging module 312 that performs protocol binding for typical MS management sessions over considered bearers stack, for example, HTTP over TCP/IP or WAP. A DM engine module 314 includes a DMT Engine that performs the same function as in DMS 200 but extended for diagnostics case, a DM agent that performs the same function as in DMS 200 but extended for diagnostics case, an OMA-DM (Open Mobile Alliance-Device Management) agent that performs the same function as in DMS 200 but extended for diagnostics case, and a Policy agent that is responsible for respecting the policies dictated to the MS by DMSOS 122, such as a call logging model and a format and frequency of corresponding reports. A Call Logger 316 and a corresponding API (Application Program Interface) is an additional source for the DM Engine mechanism and facilitates a delivery of a corresponding report to a given call logging model and policy. MS 102 further includes a limited life power supply 318, typically a battery, that provides the power for the operation of the MS and the components of the MS, such as processor 302 and at least one memory device 304.

Communication system 100 may operate in accordance with any one of various standards such as CDMA (Code Division Multiple Access) and variants thereof, GSM (Global System for Mobile communications), GPRS (General Packet Radio System), TDMA (Time Division Multiple Access), FDMA (Frequency Division Multiple Access), any one of the IEEE (Institute of Electrical and Electronics Engineers) 802.xx standards, for example, the 802.11, 802.15, 802.16, or 802.20 standards, 3G systems such as UMTS (Universal Mobile Telecommunication Service) and CDMA 2000, or 4G systems such as OFDM (Orthogonal Frequency Division Multiple Access). By operating in accordance with well-known protocols, a user of MS 102 can be assured that MS 102 will be able to communicate with access network 110 and establish a packet data communication link with an external network via the access network.

When a user of MS 102 activates the MS, the MS registers with access network 110 in accordance with well-known registration techniques. As part of the registration procedure, a presence of an activated MS 102 is detected and stored in Presence Server 126. When an MS, such as MS 102, is engaged in a call, the MS may then periodically monitor a strength of pilot channels associated with nearby BSSs or RANs and report the signal strength measurements back to a BSS or RAN serving the MS. The signal strength reports may be transmitted by the MS when the measurements are made or, in order to save battery strength and bandwidth, may be transmitted by the MS only when the measured signal strengths fall beneath a predetermined threshold.

Such signal strength reports are not sufficient to quickly and clearly detect sleeping cells and coverage holes, and detection based on such signal strength reports is limited by the fact that only an MS engaged in a call is reporting back. Furthermore, the signal strengths are not necessarily the system parameters that are most useful for optimization of system performance. In addition, a periodic measuring and reporting of signal strengths by an MS engaged in a call does not provide an accurate system for gauging an impact on system coverage of a change in an access network configuration. Furthermore, typically the terminating network element for such signal strength reports is a BSS or RAN and the BSS or RAN are not the best network elements for optimizing system performance based on such reports.

Therefore, communication system 100 provides for a managing of MSs wherein the MSs may be selectively instructed to monitor, measure, and report system parameters, may be instructed which system parameters to measure and report, and may further be instructed as to the conditions under which to monitor, measure, and report the system parameters. In addition, communication system 100 provides for an end-to-end messaging via access network 110 and core network 120 with respect to the instructing and reporting, thereby permitting network elements that are best able to perform system optimization, such as DMSOS 122, to control the monitoring, measuring, and reporting by the MSs.

Figure 4:
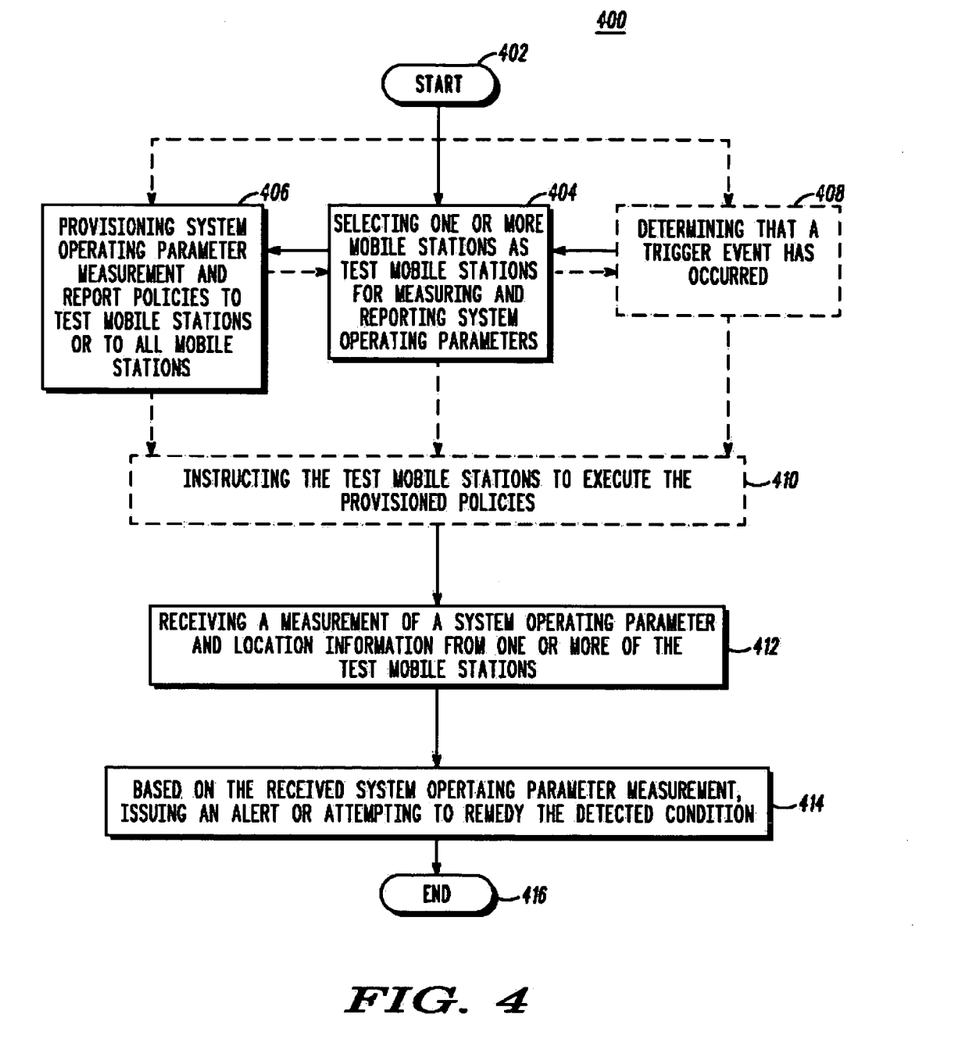
FIG. 4 is a logic flow diagram of a process executed by a communication system of FIG. 1 in managing a monitoring and a reporting of system operating parameters by a mobile station of FIG. 1 in accordance with various embodiments of the present invention.

Referring now to FIG. 4, a logic flow diagram 400 is provided that illustrates a method by which one or more network servers 122, 124 of communication system 100 manages a measuring and reporting by MSs operating in communication system 100 in accordance with various embodiments of the present invention. Logic flow diagram 400 begins (402) when one or more MSs, such as MS 102, operating in communication system 100 are selected (404) as test MSs that are to measure and report system operating parameters and are provisioned (406) corresponding system operating parameter measurement and report policies. The system operating parameter measurement and report policies comprise criteria that may be used by each test MS to determine what system operating parameters to measure and when to measure and report such parameters. For example, the system parameter measurement and report policies may comprise criteria concerning one or more trigger events that trigger a measuring of system operating parameters and/or a sending of measured system operating parameters, information concerning system operating parameters to be measured and corresponding thresholds that may be used to determine whether the one or more trigger events have occurred, instructions for assembling a report message that includes the measured system operating parameters, and a destination address, such as a routing address associated with DMSOS 122, for a conveyance of the report.

The provisioning (406) of the system operating parameter measurement and report policies may occur prior to, contemporaneous with, or subsequent to the selection (404) of the test MSs that will execute the policies. For example, in one embodiment of the invention, DMSOS 122 may determine a coverage area to be tested at step 404, such as coverage area 104, and may then provision the system operating parameter measurement and report policies to each MS, such as MS 102, residing in the coverage area. The provisioned policies may then include instructions (410) to execute the policies. In one such embodiment, DMSOS 122 may provision the policies by requesting that broadcast application server 132 set up a broadcast associated with a Broadcast-Multicast Service (BCMCS) or a Multimedia Broadcast/Multicast Service (MBMS) in a specified coverage area, such as coverage area 104. DMSOS 122 further conveys the system parameter measurement and report policies to the broadcast application server. BCMCS is described in detail in the 3GPP2 (Third Generation Partnership Project Two) X.P0022, A.S00019, C.S0054, C.S0005 and S.R0083 specifications and MBMS is described in detail in 3GPP (Third Generation Partnership Project) TS (Technical Specification) 23.246, TS 22.146, TS 25.346, and TS 29.846, which specifications are hereby incorporated herein in their entirety. In response to receiving the broadcast request, broadcast application server 132 establishes a multicast, or Point-To-Multipoint (PTM), communication channel or an individual unicast, or Point-To-Point (PTP), communication channel to each MS residing in the coverage area, that is, MS 102 and coverage area 104. Broadcast application server 132 then multicasts or unicasts the system parameter measurement and report policies to MS 102 via the established communication channel.

In another such embodiment of the present invention, in executing step 406, DMSOS 122 may query Presence Server 126 and/or location and provisioning database 130 to identify MSs, such as MS 102, that are actually located in a coverage area, such as coverage area 104, where the DMSOS wants to perform a test. DMSOS 122 may then convey the system parameter measurement and report policies to each identified MS via a broadcast channel or a forward link signaling channel of an air interface associated with the coverage area, that is, air interface 106. For example, DMSOS 122 may convey a Short Message Service (SMS) message to each such MS instructing the MS to monitor a signaling channel or a common channel, such as a broadcast channel. DMSOS 122 may then convey the system parameter measurement and report policies over the monitored channel.

In still another such embodiment of the present invention, in executing step 406, DMSOS 122 may determine, by reference to access network 110, which MSs are currently actively engaged in a communication session in a coverage area desired to be tested, for example, are currently assigned a traffic channel in the coverage area. DMSOS 122 may then convey the system parameter measurement and report policies to each such MS via the assigned forward link traffic channel or via a forward link signaling channel. By requesting reporting from an MS that is currently engaged in a call, communication system 100 may take advantage of a reporting of data that may already be collected and stored by such an MS.

In another embodiment of the present invention, the system operating parameter measurement and report policies may be provisioned, at step 406, to each MS prior to a selecting, at step 404, of a coverage area or one or more MSs for testing.

For example, an operator of communication system 100 may pre-program each MS with the system operating parameter measurement and report policies or may convey the policies to each MS operating in communication system 100 via a system-wide MBMS or BCMCS broadcast as described in greater detail above. In one such embodiment of the present invention, the system parameter measurement and report policies so provisioned to each MS, such as MS 102, may include criteria that allow the MS to self-determine whether a trigger event has occurred that occasions an execution of the measurement and report policies. However, in another embodiment of the present invention, the determination of when a trigger event has occurred may be made (408) by DMSOS 122, and more particularly DMS 200. In response to determining that a trigger event has occurred, DMSOS 122 may then instruct (410) each test MS, that is, each MS selected by the DMSOS to measure the system operating parameters or residing in a coverage area selected for testing by the DMSOS, such as MS 102, to execute the provisioned system operating parameter measurement and report policies. The instruction may be conveyed to each test MS via a broadcast message or via a message, such as an SMS message, that is conveyed via a forward link traffic channel or a forward link signaling channel monitored by the MS.

In yet other embodiments of the present invention, DMSOS 122 may execute step 408 prior to steps 404 and 406. That is, DMSOS 122 may determine (408) that a trigger event has occurred and, in response to determining that the trigger event has occurred, select (404) a coverage area for testing or select one or more MSs to perform the testing and provision (406) the system operating parameter measurement and report policies to the test MSs (if such policies have not yet been provisioned to the MSs). DMSOS 122 may further convey (410) an instruction to a test MS, as a part of or separate from the provisioned policies, to execute the provisioned policies.

Subsequent to provisioning the system parameter measurement and report policies to test MSs, or in response to instructing test MSs to execute provisioned system parameter measurement and report policies, DMSOS 122 receives (412), from one or more test MSs, system operating parameter measurement reports comprising system operating parameter measurements made by the MS and information concerning a location of the MS. Based on the received system operating parameter measurement reports, DMSOS 122 may issue (414) an alert, preferably alerting an operator of communication system 100 to a system condition that is detected based on the received measurements and location information, such as a sleeping cell or a coverage hole. In another embodiment of the present invention, based on the received system operating parameter measurement reports, DMSOS 122 may take (414) corrective action in an attempt to remedy the detected condition, and logic flow 400 ends (416). For example, in the event that a sleeping cell is detected, DMSOS 122 may attempt to wake up the cell. By way of another example, in the event that a coverage hole is detected, DMSOS 122 may request that surrounding cells increase their transmit power. By way of yet another example, when DMSOS 122 determines that a configuration change at an access network has resulted in diminished system performance, the DMSOS may instruct the access network to revert to a previous configuration.

By providing for a provisioning of system operating parameter measurement and report policies to test MSs that are either selected by a network server or that reside in a coverage area where testing is desired, communication system 100 permits an automated, dynamic, and selective testing of system operating conditions and configuration changes. The policies may be provisioned only to the test MSs, or the policies may be provisioned to all MSs operating in communication system 100 and then only the test MSs are instructed by the network server to execute the provisioned policies. An execution of the policies are occasioned by an occurrence of a trigger event. Criteria concerning the trigger event may be included in the policies provisioned to the test MSs, or the network server may determine an occurrence of a trigger event and then instruct the test MSs to execute the provisioned policies. Upon execution of the policies, each test MS measures system operating parameters defined by the provisioned policies and reports the measurements, along with a location of the MS, back to the network server. Based on the received reports, the network server is able to determine if an undesirable condition exists in a coverage area associated with the test MSs or if a configuration change has had a negative impact on system performance, and may then alert the system operator or attempt to remedy the undesirable condition or configuration change.

Figure 5:
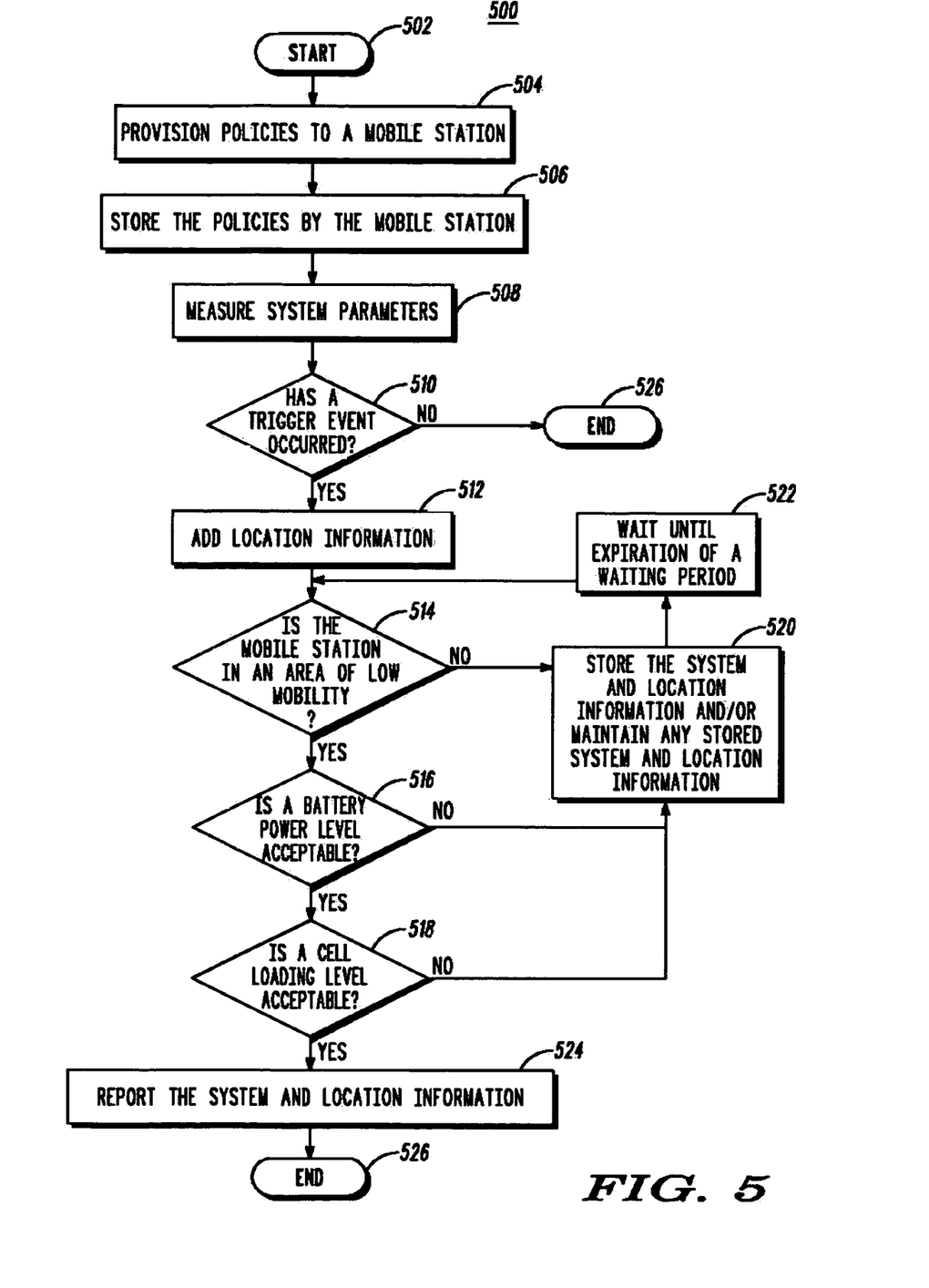
FIG. 5 is a logic flow diagram of a process executed by a communication system of FIG. 1 in monitoring and reporting system parameters in accordance with an embodiment of the present invention.

FIG. 5 is a logic flow diagram 500 of a process executed by communication system 100, and more particularly by a test MS, such as MS 102, in monitoring and reporting system parameters in accordance with an embodiment of the present invention. Logic flow diagram 500 begins (502) when an MS, that is, MS 102, is activated in communication system 100. During or subsequent to the activation of MS 102, the MS is designated a test MS and system parameter measurement and report policies are provisioned (504) to the MS as described above in greater detail. In response to receiving the system parameter measurement and report policies, MS 102 stores (506) the system parameter measurement and report policies in the at least one memory device 304 of the MS.

While operating in communication system 100, the test MS 102 monitors and measures (508) system operating parameters related to cell or sector coverage or service and stores the measurements. In one embodiment of the invention, the measured system operating parameters may be related to RF conditions in the coverage area, that is, coverage area 104. For example, measured system operating parameters may include a received signal strength, for example, a received signal strength indicator (RSSI), or a received signal quality metric, for example, a signal-to-interference ratio (SNR), a carrier-to-interference ratio (C/I), a signal power to noise power ratio (Eb/Io), a bit error rate (BERs), or a frame error rate (FER), or a transmit power level of the MS. In another embodiment of the invention, the system operating parameters may further be related to, or alternatively be related to, system performance, such as an amount of time that MS 102 waits for a channel assignment after requesting a traffic channel, an amount of time that that system 100 takes to setup a channel with the MS, or a latency with respect to a receipt of data. When measuring system operating parameters, MS 102 may further apply a time stamp to the parameter measurements, so that if a transmission of the system operating parameter measurements is delayed then communication system 100 is aware of when the measurements were made.

In order to trigger a reporting of the measured system operating parameters by MS 102, communication system 100 determines (510) whether a trigger event has occurred. The trigger event may be any event that could trigger an interest of a system operator in testing an extent of RF coverage of a coverage area or a level of service provided in the coverage area and that, as a result, triggers a report by MS 102 of the measured system operating parameters. For example, a trigger event may comprise an event that indicates that MS 102 is residing in, or has moved to, a coverage area that is associated with a sleeping cell, a poorly located cell, or a hole in system coverage. For example, a trigger event may be an event that corresponds to an unacceptable RF coverage condition, such as a sudden loss of radio frequency (RF) coverage, a precipitous drop in received signal strength or signal quality, or a high rate of dropped calls, which may indicate a sleeping cell, a poorly located cell, or a hole in system coverage. More particularly, a trigger event may comprise a signal quality metric associated with a best pilot, such as a signal-to-noise ratio (SNR), a carrier-to interference ratio (C/I), a Frame Error Rate (FER), or a Bit Error Rate (BER), that is less than a corresponding signal quality metric threshold for a first period of time. By way of another example, a trigger event may comprise a signal power metric associated with a best pilot, such as a received signal strength indicator (RSSI), a received signal code power (RSCP), or a ratio of received pilot power to total received power (Ec/Io) in a same bandwidth, that is less than a corresponding signal power threshold (for example, 'Y' dB or 'Z'%), for a second period of time. Still other examples of a trigger event comprise an error rate of messages received via a common channel, such as a paging channel, that exceeds a corresponding error rate threshold for a third period of time or a predetermined number of pilots each having a signal quality metric or a signal power metric in excess of a corresponding threshold for a fourth period of time. In yet another example of a trigger event, a trigger event may correspond to a generation or a receipt of a report after a call release type (for example, a call drop) with a predetermined SO (Service Option) or after a predetermined number of dropped calls.

Similarly, a congested cell could trigger an execution of the system operating measurement and report policies, as a congested cell may appear to be congested due poor RF coverage or poor channel availability or may be an indicator of poor RF coverage or poor channel availability in another cell. For example, low throughput or diminishing throughput, high latency in channel or call setup times, or poor signal quality may indicate a congested cell or sector. An occurrence of each such trigger event may be determined by comparing a monitored system parameter, such as signal strength or signal quality metric, a size of a change in a signal strength or a signal quality metric, a number of dropped calls over a predetermined period of time, a channel assignment time, or call setup time, to a corresponding threshold.

By way of yet another example, a trigger event may comprise a change in a configuration of access network 110 or air interface 106. That is, in response to a change in a configuration of access network 110 or air interface 106, communication system 100 may want MSs serviced by the access network or air interface to measure and report system operating parameters in order to determine an impact of the configuration change. For example, a trigger event may comprise a change in a handoff-related parameter, such as a change in a neighbor list, a change in a search window, or a change in an access window. In the event of such a parameter change, an operator of communication system 100 may find it beneficial to designate all MSs in a cluster of MSs about to be changed as test MSs, change the handoff parameter, and have the MSs retested to see if system performance has improved in response to the change.

As noted above, in one embodiment of the present invention, criteria defining a trigger event may be provided to each test MS, such as MS 102, as part of the system parameter measurement and report policies provisioned to the MS. In such an embodiment, MS 102 may then monitor the conditions concerning the trigger event, such as RF conditions or configuration parameters, and self-determine whether a trigger event has occurred. In another embodiment of the present invention, an occurrence of a trigger event may be determined by DMSOS 122. In the latter instance, when DMSOS 122 determines that a trigger event has occurred, the DMSOS may convey an instruction to MS 102 to execute measurement and report policies already provisioned to the MS or, when system parameter measurement and report policies have not yet been provisioned to the MS, may convey the system operating parameter measurement and report policies to the MS and instruct the MS to execute the conveyed policies. When the trigger event is a configuration change, DMSOS 122 may further instruct MS 102 to measure system operating parameters both before and after the configuration change.

When test MS 102 determines that a trigger event has occurred or is instructed to execute the system operating parameter measurement and report policies, the MS further determines and stores (512) information concerning a location of the MS. The location information may comprise location information that is determined by MS 102 in accordance with any of a variety of well-known techniques. For example, MS 102 may store information identifying an access network, that is, access network 110, or a transceiver, such as transceiver 112, serving the MS if such information is not already stored in the MS, or MS 102 may store information concerning a location of the MS that is determined by the MS by reference to multiple BSSs or RANs, such as by triangulation or by time differences of arrival, or if the MS includes GPS (Global Positioning Satellite) capabilities, the MS may store location information determined by reference to a constellation of GPS satellites. The MS, that is MS 102, then determines whether and when to report the monitored system parameters and stored location information.

Since communication system 100 may desire to test areas of poor RF coverage, it may not be efficient for an MS that briefly resides in such a coverage area to execute the system operating parameter measurement and report policies. Therefore, in order to ensure that an MS, such as MS 102, can provide valuable data, the MS may determine (514) whether it is in an area of low mobility prior to reporting the system parameter and location information. Accordingly, the system operating parameter measurement and report policies provisioned to MS 102 may further include criteria that allow the MS to determine whether it is in an area of low mobility.

For example, an indicator of low mobility may comprise a first velocity threshold, wherein an MS that is moving at a velocity that is less than the first velocity threshold may determine that it is in an area of low mobility. Other indicators of low mobility may include a handoff time threshold or a change of best cell/sector time threshold, wherein an MS that has not engaged in a handoff for a period of time in excess of the handoff time threshold or has not changed a best cell or sector for a period of time in excess of the change of best cell/sector time threshold may conclude that it is in an area of low mobility. On the other hand, the criteria that allow the MS to determine whether it is located in an area of low mobility may specify that a moving MS, or an MS that is moving at a velocity in excess of a second velocity threshold, which may or may not be the same as the first velocity threshold, need not report the system parameter and location information.

Typically, a reporting of the system operating parameter measurements is not delay sensitive information. As a result, and further in order to minimize any inconvenience to a user of a test MS or to communication system 100, it may be desirable for a test MS to report the system parameter measurements only when an acceptable amount of power is available for making such a report and/or only when a transmission of such a report will not congest the coverage area/access network serving the MS. Therefore, a test MS, that is, MS 102, may determine (516, 518) when to report the system parameters and location information based on a quantity of power available to the MS and/or a loading of a coverage area/access network serving the MS, that is, coverage area 104 and access network 110. Criteria that may be used by MS 102 to determine whether an acceptable amount of power is available for reporting the system parameter measurements and/or whether a transmission of such a report may congest the coverage area/access network serving the MS may be provisioned to the MS as a part of the system operating parameter measurement and report policies.

For example, criteria used to determine whether MS 102 has an acceptable amount of power available to report the system parameter measurements may include a power supply output power threshold, such as a battery power threshold, wherein the MS may report the system parameter and location information only when the power output by the MS's power supply 318 exceeds the output power threshold, or wherein the MS may not report the system parameter and location information when the power output by the MS's power supply 318 is less than the output power threshold. By way of another example, the criteria may specify that an acceptable amount of power is available to MS 102 to transmit a report of the system parameters and location information whenever the MS is plugged into a power source.

As noted above, the policies may further or alternatively specify that a test MS, that is, MS 102, may transmit a report comprising the system parameter and location information only when the cell or sector servicing the MS is acceptably RF loaded. For example, criteria considered by access network 110 in determining whether coverage area 104 is acceptably loaded may include a quantity of available communication channels, a number of MSs residing in the coverage area, a quantity of reverse link messages received by the network via one or more reverse link channels during a period of time, signal quality metrics determined with respect to signals received by access network 110 via air interface 106, or an Ec/Ior (pilot power to total transmit power ratio) determination at access network 110. The access network may then convey congestion information to the MS that is associated with load level and that is used by the MS to determine whether to transmit a report. By way of another example, MS 102 may determine an RF loading of coverage area 104 by estimating Ec/Ior based on an Ec/Io of a pilot received by the MS from access network 110, an RSSI of the pilot, and measurements determined with respect to other pilot channels received by the MS. By comparing the load criteria to a corresponding load threshold, MS 102 or access network 110 may determine whether coverage area 104 is acceptably loaded or heavily loaded and whether MS 102 may delay reporting the system parameter measurements and location information. For example, if the Ec/Io of a pilot received by the MS from access network 110 is good, that is, exceeds a corresponding threshold, then MS 102 may determine that coverage area 104, and correspondingly access network 110, is acceptably loaded. By way of another example, even if Ec/Io is marginal but the pilot channel power level (RSSI) is near a noise floor or the surrounding pilot channels being measured amount to a significant component of 'Io,' then MS 102 may determine that coverage area 104, and correspondingly access network 110, is acceptably loaded. Similarly, when the converse is true then MS 102 may determine that coverage area 104, and correspondingly access network 110, is heavily loaded. Those who are of ordinary skill in the art realize that many other criteria may be considered in determining a loading of a coverage area or access network, which criteria may be used herein without departing from the spirit and scope of the present invention.

When a trigger event has occurred and one or more of MS 102 is in an area of low mobility, an acceptable amount of power is available to MS 102 for a transmission of the report, and a loading of coverage area 104 is acceptable, whichever is appropriate, then MS 102 assembles a measurement report message comprising the measured system parameter(s) and the location information and conveys (524) the measurement report message to DMSOS 122 via access network 110. Logic flow 500 then ends (526).

When a trigger event has occurred and any one or more of MS 102 is not in an area of low mobility, a power level of power source 318 of MS 102 is unacceptably low, or coverage area 104 is unacceptably, that is, too heavily, loaded, then MS 102 stores (520) the measured system parameters and location information to produce stored system parameters and location information in at least one memory device 304 for reporting at a later time. MS 102 may or may not assemble the measurement report message as part of storing the measured system parameters and location information. MS 102 then waits (522) until an expiration of a period of time corresponding to a waiting period.

Upon expiration of the waiting period, MS 102 reconsiders whether to report the stored system parameters and location information, that is, MS 102 re-determines whether the MS is in an area of low mobility (514), whether a power level of power source 418 of MS 102 is acceptable (516) or the MS is plugged in, and/or whether a loading of coverage area 104 is acceptable (518). When, upon expiration of the waiting period, any one or more of such reporting factors persists, that is, MS 102 is not in an area of low mobility, a power level of power source 318 of MS 102 remains unacceptably low, or coverage area 104 remains unacceptably loaded, MS 102 continues to maintain the stored system parameters and location information in at least one memory device 304. When, upon expiration of the waiting period, MS 102 determines that it is in an area of low mobility, ample power is available for a transmission of the report, and a loading of coverage area 104 is acceptable, whichever is appropriate, then the MS assembles, if not yet assembled, and conveys (524) the measurement report message to DMSOS 122 and logic flow 500 then ends (526).

In order to prevent a congestion of the reverse link of air interface 106 when multiple MSs are transmitting measurement report messages in a coverage area after waiting for an expiration of the waiting period, upon expiration of the waiting period each such MS may back off transmitting its measurement report message for a pre-determined or randomly determined back off period. Many back off algorithms are well-known in the art and any such back off algorithm may be used herein without departing from the spirit and scope of the present invention.

Figure 6:
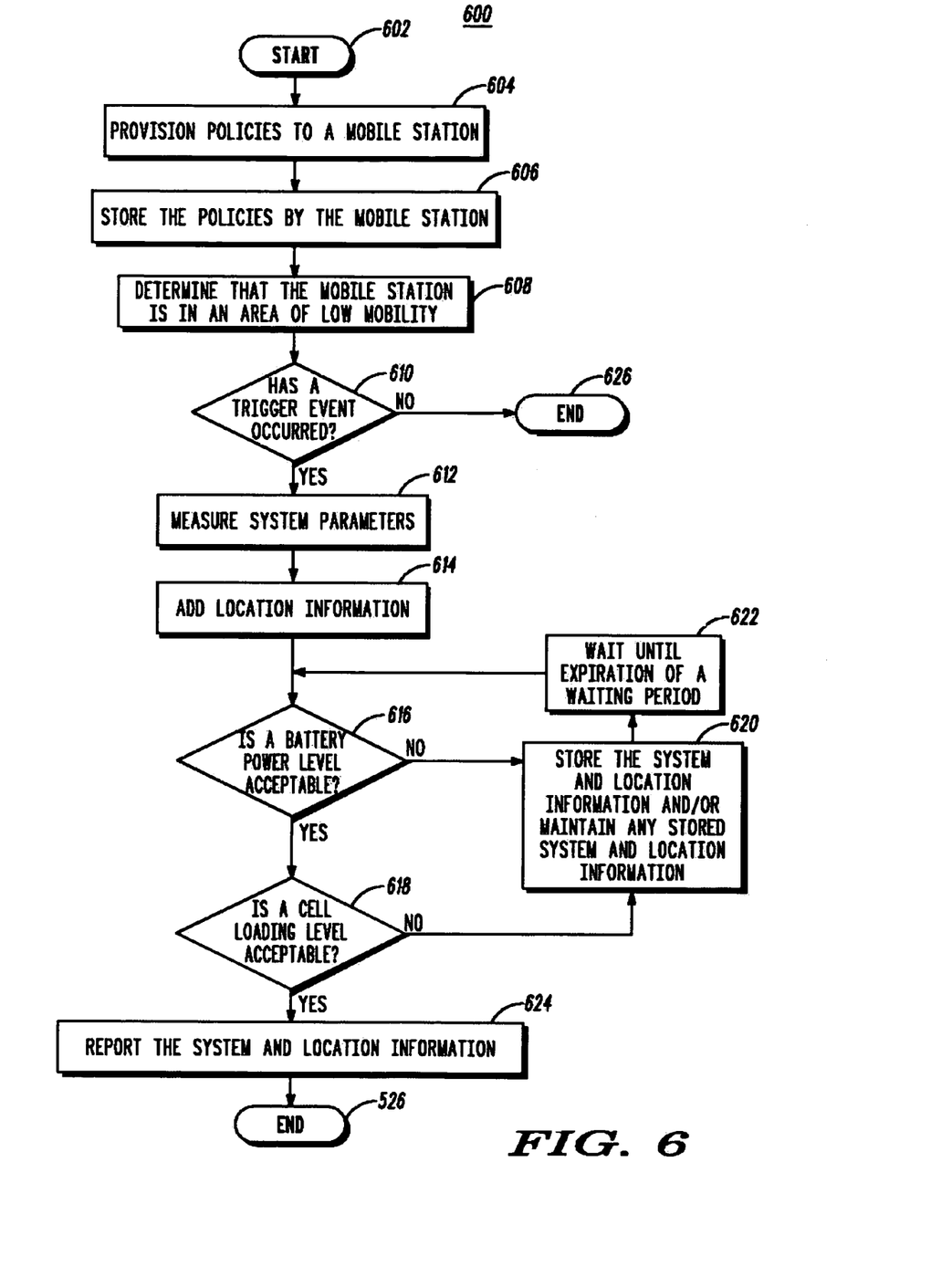
FIG. 6 is a logic flow diagram of a process executed by a communication system of FIG. 1 in monitoring and reporting system parameters in accordance with another embodiment of the present invention.

FIG. 6 is a logic flow diagram 600 of a process by which communication system 100 manages a monitoring and reporting of system parameters by MS 102 in accordance with another embodiment of the present invention. Similar to logic flow diagram 500, logic flow diagram 600 begins (602) when an MS, such as MS 102, is activated in communication system 100. During or subsequent to the activation of the MS, and before, during, or after designation of the MS as a test MS, system operating parameter measurement and report policies are provisioned (604) to the MS. In response to receiving the system parameter measurement and report policies, MS 102 stores (606) the system parameter measurement and report policies in at least one memory device 304 of the MS. The system parameter measurement and report policies provisioned to MS 102 include criteria that may be used to determine whether the MS is operating in an area of low mobility.

While operating in communication system 100, the test MS, that is, MS 102, determines (608) that the MS is operating in an area of low mobility. In response to determining that it is operating in an area of low mobility, MS 102 determines (610) whether a trigger event has occurred. However, in another embodiment of the present invention, DMSOS 122 may determine that MS 102 is operating in an area of low mobility and, in response thereto, instruct the MS to execute the system parameter measurement and report policies. In response to receiving such an instruction, MS 102 then determines (610) whether a trigger event has occurred. As noted above in greater detail, the trigger event may be any event that could trigger an interest of a system operator in performing a test of an extent of RF coverage of a coverage area or a level of service provided to a coverage area and that, as a result, triggers an execution of the measurement and report policies.

In response to determining that a trigger event has occurred, the test MS, that is, MS 102, measures (612) system operating parameters related to cell or sector coverage or service and stores the measurements in at least one memory device 304 to produce stored system parameters. MS 102 further determines and stores (614) in at least one memory device 304 information concerning a location of the MS to produce stored location information. As described in detail above, the location information may comprise location information that is determined by MS 102 in accordance with any of a variety of well-known techniques.

Subsequent to determining that a trigger event has occurred, the test MS, that is, MS 102, then determines (616, 618) whether to report the stored system parameter measurements and location information based on a quantity of power available to the MS and/or a loading of a coverage area, that is, coverage area 104, or an access network, that is, access network 110, serving the MS. Accordingly, the system parameter measurement and report policies may further include criteria that allow the MS to make such determinations.

When a power level of power source 318 of MS 102 is acceptable or the MS is plugged in, and/or a loading of coverage area 104 or access network 110 is acceptable, whichever is appropriate, MS 102 assembles a measurement report message that comprises the measured system parameter(s) and the location information and conveys (624) the measurement report message to DMSOS 122 via access network 110. Logic flow 600 then ends (626).

When a trigger event has occurred and the test MS, that is, MS 102, determines one or more of a power level of power source 418 of the MS is unacceptably low or coverage area 104 or access network 110 is unacceptably loaded, whichever is appropriate, then MS 102 stores or maintains (620) the system parameter measurements and location information in at least one memory device 304 for reporting at a later time. MS 102 may or may not assemble the measurement report message as part of storing or maintaining the measured system parameters and location information. MS 102 then waits (622) until an expiration of a period of time corresponding to a waiting period.

Upon expiration of the waiting period, MS 102 reconsiders whether to report the system parameters and location information, that is, MS 102 re-determines (616, 618) whether an acceptable amount of power is available to the MS to transmit the report and/or whether a loading of coverage area 104 is acceptable. So long as any one or more of a power level of power source 318 of MS 102 is unacceptably low (and the MS is not plugged in) or coverage area 104 or access network 110 is unacceptably loaded, whichever is appropriate, MS 102 continues to maintain the measured system parameters and location information in at least one memory device 304. When, upon expiration of the waiting period, MS 102 determines that an acceptable amount of power is available to MS 102 to transmit the measurement report message and/or a loading of coverage area 104 is acceptable, whichever is appropriate, then the MS assembles, if not yet assembled, and conveys (624) the measurement report message to DMSOS 122 and logic flow 600 then ends (626). Similar to logic flow diagram 500, in order to prevent a congestion of the reverse link of air interface 106 when multiple MSs are transmitting measurement report messages in a coverage area after waiting for an expiration of the waiting period, upon expiration of the waiting period each such MS may back off transmitting its measurement report message for a pre-determined or randomly determined back off period.

By reporting a measured system operating parameter and further providing location information to DMSOS 122, test MS 102 permits the network server to optimize system performance by detecting sleeping cells, coverage holes, or other flaws in system coverage or by determining an impact of a change in an access network configuration. The test MS determines what system operating parameters to measure and when to report based on policies provisioned to the test MS. The policies may be pre-programmed into the MS or provisioned to the MS by the DMSOS. The policies may include trigger event information that permits the test MS to determine whether a trigger event has occurred, or DMSOS 122 may instruct the MS to report based on the provisioned policies. To minimize system and user inconvenience, a sending of a report by the test MS may be further based on one or more of whether the MS is in an area of low mobility, has an associated power source with an acceptable power output level, and is operating in a cell with an acceptable load level.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for managing reporting by a mobile station comprising:

determining, by an infrastructure, a test coverage area;

determining, by the infrastructure, a plurality of mobile stations associated with the test coverage area to produce a plurality of test mobile stations;

in response to determining the plurality of test mobile stations, provisioning, by the infrastructure to the plurality of test mobile stations and over the air, policies that prompt a reporting by the test mobile stations, wherein the policies comprise an identification of the system operating parameters to be measured by the test mobile stations, instructions for assembling a report message that comprises the measured system operating parameters, and a destination address for a conveyance of the report message; and in response to provisioning the policies to the plurality of test mobile stations, reporting, by one or more mobile stations of the plurality of test mobile stations, measured system operating parameters;

wherein reporting comprises:

determining, by each test mobile station of the plurality of test mobile stations, whether the test mobile station is in an area of low mobility, has an acceptable power source output level, and is operating in a cell with an acceptable cell loading level;

when the test mobile station is in an area of low mobility, has an acceptable power source output level, and is operating in a cell with an acceptable cell loading level, reporting, by the test mobile station, the measured system operating parameters; and when a test mobile station of the plurality of test mobile stations is not in an area of low mobility, does not have an acceptable power source output level, and is not operating in a cell with an acceptable cell loading level, storing, by the test mobile station, the measured system parameters to produce stored system parameters and waiting, by the test mobile station, for an expiration of a waiting period before reconsidering reporting the stored system parameters.

2. The method of claim 1, further comprising determining, by a reporting test mobile station, a location of the mobile station and wherein reporting further comprises reporting, by the test mobile station, a location of the test mobile station.

3. The method of claim 1, wherein when, upon expiration of the waiting period, the test mobile station is in an area of low mobility, has an acceptable power source output level, and is operating in a cell with an acceptable cell loading level, reporting, by the test mobile station, the stored system parameters.

4. The method of claim 1, further comprising determining, by the test mobile station, a location of the test mobile station, wherein reporting further comprises reporting, by the test mobile station, the location of the test mobile station, and wherein storing further comprises storing the location of the test mobile station as part of the stored system parameters.

5. A system for managing reporting by a mobile station, the system comprising:

a network server comprising:

an at least one memory device that maintains policies that comprise an identification of system operating parameters to be measured by test mobile stations, instructions for assembling a report message that comprises the measured system operating parameters, and a destination address for a conveyance of the report message; and a processor that is configured to determine a test coverage area, determine a plurality of mobile stations associated with the test coverage area to produce a plurality of test mobile stations, in response to determining the plurality of test mobile stations, provision, to the plurality of test mobile stations and over the air, the policies, instructions, and a destination address, and by provisioning the policies, instructions, and a destination address to the test mobile stations prompt a reporting by the test mobile stations of measured system operating parameters, and in response to provisioning the policies to the plurality of test mobile stations, receive, from one or more test mobile stations of the plurality of test mobile stations, the measured system operating parameters; and a mobile station that is configured to, in response to receiving the policies, determine whether the mobile station is in an area of low mobility, has an acceptable power source output level, and is operating in a cell with an acceptable cell loading level, when the mobile station is in an area of low mobility, has an acceptable power source output level, and is operating in a cell with an acceptable cell loading level, report the measured system operating parameters, and when the mobile station is not in an area of low mobility, does not have an acceptable power source output level, and is not operating in a cell with an acceptable cell loading level, store the measured system parameters to produce stored system parameters and wait for an expiration of a waiting period before reconsidering reporting the stored system parameters.

* * * * *